United States Patent [19]

Wagner

[11] Patent Number: 4,644,745
[45] Date of Patent: Feb. 24, 1987

[54] FIXED GEOMETRY ROCKET THRUST CHAMBER WITH VARIABLE EXPANSION RATIO

[75] Inventor: William R. Wagner, Los Angeles, Calif.

[73] Assignee: Rockwell International Corporation, El Segundo, Calif.

[21] Appl. No.: 762,030

[22] Filed: Aug. 2, 1985

Related U.S. Application Data

[63] Continuation of Ser. No. 577,940, Feb. 8, 1984, abandoned.

[51] Int. Cl.$^4$ ............... F02K 9/00; F02K 9/42; F02K 9/72
[52] U.S. Cl. ........................... 60/258; 60/741
[58] Field of Search .......... 60/233, 240, 243, 257, 60/258, 259, 260, 741; 239/265.11, 265.19

[56] References Cited

U.S. PATENT DOCUMENTS

| | | | |
|---|---|---|---|
| 2,995,008 | 8/1961 | Fox | 60/259 |
| 3,112,988 | 12/1963 | Coldren et al. | 60/270.1 |
| 3,321,920 | 5/1967 | Walter et al. | 60/257 |
| 3,451,221 | 6/1969 | Boe | 60/258 |
| 3,507,116 | 4/1970 | Berry | 60/258 |
| 3,527,056 | 9/1970 | Hoffman | 60/258 |
| 3,717,999 | 2/1973 | Wilson | 60/258 |

FOREIGN PATENT DOCUMENTS 2258390 6/1974 Fed. Rep. of Germany ........ 60/258

OTHER PUBLICATIONS

Gill et al., "Determination of Rocket Motor Combustion Parameters by Means of a Diverging Reactor"; 7th Combustion Symposium, 1958.
Lieamann et al., *Elements of Gas Dynamics*, Wiley & Sons, New York, 1967, pp. 301–303.

*Primary Examiner*—Carlton R. Croyle
*Assistant Examiner*—Donald E. Stout
*Attorney, Agent, or Firm*—H. Fredrick Hamann; Harry B. Field; Lawrence N. Ginsberg

[57] ABSTRACT

The present invention provides a rocket thrust chamber (30) comprising a combustor (32) with a fixed divergent profile, a nozzle (36) for further expanding the output of the divergent combustor and a high-velocity, throttleable injector (34) for injecting propellants at such an initial velocity and initially rapid, axial burning rate that the injected propellants achieve sonic flow conditions at preselected locations within the divergent combustor according to throttle setting. In operation, the throttle setting fixes the location of the sonic flow line within the divergent combustor, and the ratio of the nozzle exit area with respect to the effective area of the divergent combustor at the sonic location area fixes the expansion ratio for that throttle setting. At launch, the engine delivers a high propellant flow rate and a moderate expansion ratio, while in space, it delivers a low propellant flow rate and a far greater expansion ratio.

9 Claims, 7 Drawing Figures

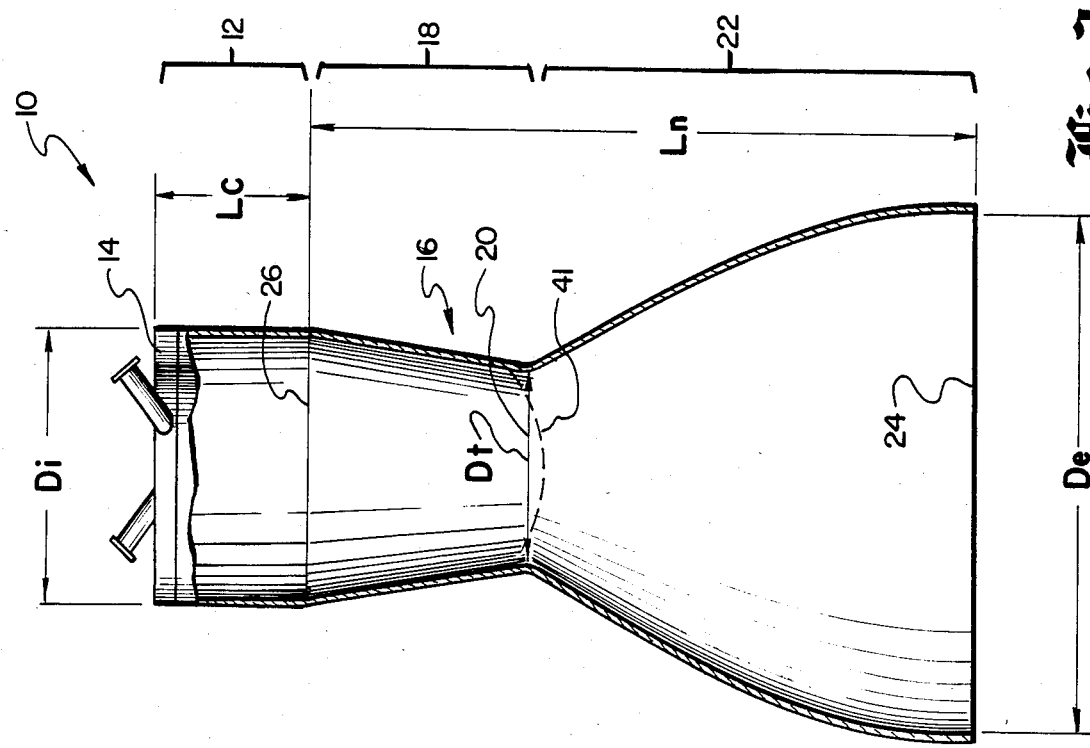
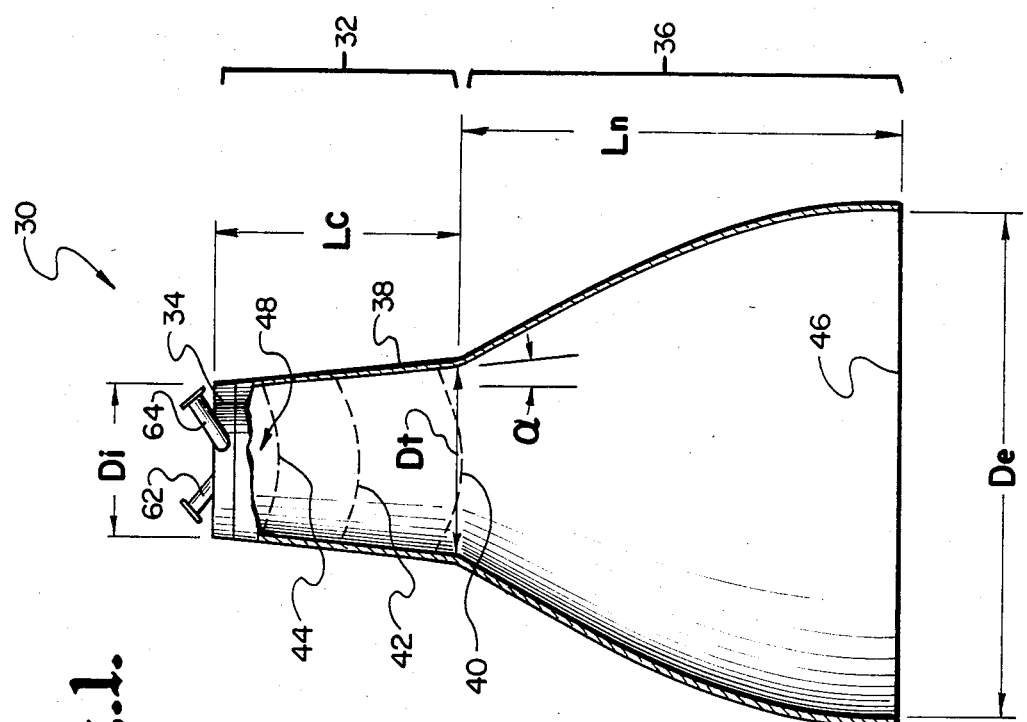

4,644,745

FIXED GEOMETRY ROCKET THRUST CHAMBER WITH VARIABLE EXPANSION RATIO

This is a continuation of co-pending application Ser. No. 577,940 filed on Feb. 8, 1984, now abandoned.

BACKGROUND OF THE INVENTION

1. Field of the Invention

The present invention relates generally to rocket thrust chambers and more particularly to fixed geometry rocket thrust chambers having means for varying their nozzle expansion ratios.

2. The Prior Art

In the past, it was almost universal practice to use staged launch vehicles for orbital or extra-orbital space missions such that the engines of each stage could be equipped with nozzles having expansion ratios befitting the prevailing ambient pressure conditions and performance requirements for the particular stage. Since first stage engines had to be operable at sea level ambient conditions, they were commonly equipped with nozzles having a moderate expansion ratio, whereas those of the upper stages were commonly equipped with nozzles having much higher expansion ratios.

With today's unstaged launch systems, problems arise as to how to optimalize the engine(s) of the launch vehicle so that it can operate efficiently both at the launch pad and in-space. The problem is two-fold in that an engine whose expansion ratio is optimal at launch is grossly underexpansive in space. Secondly, an engine which is sized for launch will be too big for use in space and will overaccelerate the space vehicle and-/or its occupants if it is operated at full thrust in the latter phases of the launch. So far, the choice has been to use fixed geometry engines which have intermediate expansion ratios; this solution causes the engines to suffer performance penalties from overexpansion at launch and from under-expansion at all other phases of their mission.

Of course, practitioners of the prior art have attempted to resolve the above problems by "unfixing" the geometry of the nozzle by means of using deployable nozzle sections or inflatable, extendable nozzle plugs or other mechanical means for changing the contour of the nozzle, the idea being that once the rocket motor reaches space, the geometry of its nozzle could be changed to give the desired greater nozzle ratio. However, these devices add great weight and complication to the rocket motor, and are subject to failure because of the hostility of their working environment.

OBJECTS OF THE INVENTION

It is therefore an object of the present invention to provide a rocket motor which can provide optimum nozzle expansion both at launch and in space without adding weight, complication, or risk of failure.

It is yet another object of the present invention to provide a rocket motor which can be operated at high propellant flow rates and thrust during initial ascent and also be operated at low propellant flow rates with fuller expansion and optimal thrust performance in space.

It is still another object of the present invention to provide a rocket motor which can provide the above recited advantages with a fixed-geometry nozzle.

SUMMARY OF THE INVENTION

These and other objects are accomplished by the present invention which provides a rocket thrust chamber comprising a combustor with a fixed divergent profile, a nozzle for further expanding the output of the divergent combustor and a high-velocity, throttleable injector for injecting propellants into the divergent combustor at such an initial velocity and initially rapid axial burning rate that the injected propellants achieve sonic flow conditions at preselected locations within the divergent combustor according to the throttle setting of the injector. In operation, the throttle setting fixes the location of the sonic flow line within the divergent combustor, and the ratio of the effective area of the divergent combustor at the sonic location with respect to the nozzle exit area fixes the expansion ratio for that throttle setting. At launch, the engine delivers a high propellant flow rate and a moderate expansion ratio, while in space, it delivers a low propellant flow rate and a far greater expansion ratio. Thusly, the thrust chamber of the present invention can be tailored to provide optimal performance at all phases of the launch.

Other objects, advantages and novel features of the present invention will become apparent from the following detailed description of the invention when considered in conjunction with the accompanying drawing.

BRIEF DESCRIPTION OF THE DRAWING

FIG. 1 is a cross-sectional side view of a fixed geometry, variable-area thrust chamber constructed according to the preferred embodiment of the present invention.

FIG. 7 is an enlarged cross-sectional view of an axial momentum exchanger injector element which could be used instead of an impinging type injector element in the injector shown in FIG. 1.

The same elements or parts throughout the figures of the drawing are designated by the same reference characters, while equivalent elements bear a prime designation.

DETAILED DESCRIPTION OF THE PREFERRED EMBODIMENTS

Figure 2:
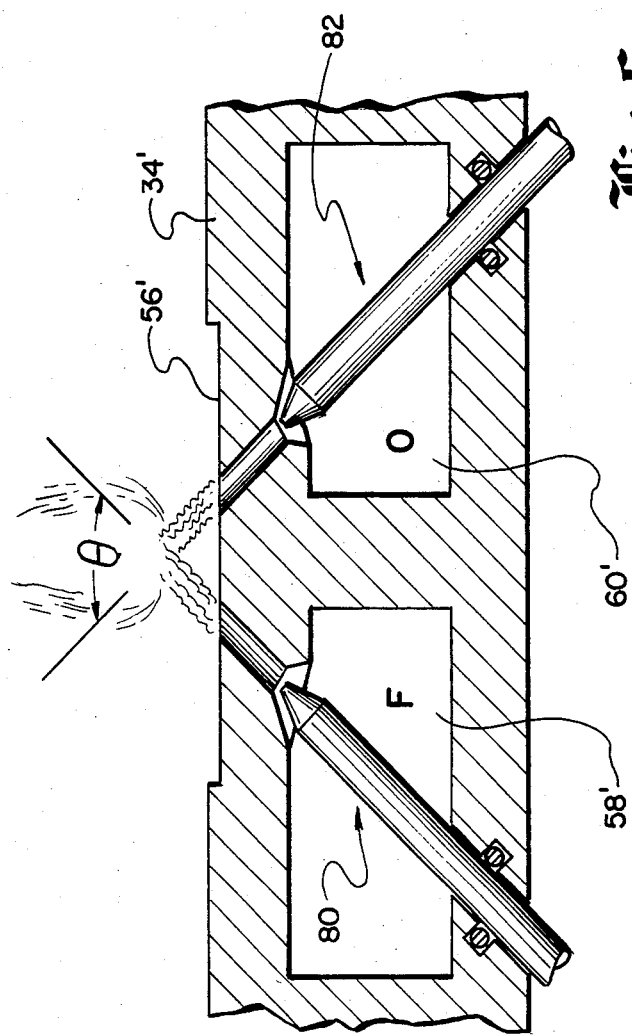
FIG. 2 is a side view of a thrust chamber constructed according to the prior art and incorporating a long cylindrical combustion chamber and a deLaval nozzle. The nozzles of FIGS. 1 and 2 are configured to deliver approximately the same maximum thrust at the same maximum flow rate.

Referring to FIG. 2, the prior art typically provides a thrust chamber 10 comprising a cylindrical combustor 12, an injector 14 for injecting propellants at relatively low initial velocities (about Mach 0.05) into combustor 12, and a deLaval nozzle 16 having a convergent portion 18 which contracts the combusted propellants delivered by the combustor 12 to achieve sonic flow conditions at and about the nozzle throat plane 20 and a divergent portion 22 which then expands the flow to achieve supersonic exit velocities at nozzle exit plane 24. Since the flow conditions are choked at throat plane 20 throughout the useable operating range of thrust chamber 10, the nozzle expansion area ratio for thrust chamber 10 is fixed by the ratio of the area at nozzle exit plane 24 divided by the area at nozzle throat plane 20. The contour of deLaval nozzle 16 is governed by assumptions that combustion is essentially complete at nozzle inlet plane 26 and that the axial rate of area change along the nozzle will proceed substantially according to the following relationship:

$$\left(\frac{dM^2}{M^2}\right) = -\frac{2\left(1 + \frac{\gamma - 1}{2} M^2\right)}{1 - M^2}\left(\frac{dA}{A}\right) \quad (1)$$

Thus, it can be seen that prior art thrust chamber 10 operates on the principle of according to the combustor 12 the sole function of containing the propellants as they undergo combustion and delegating to deLaval nozzle 16 the function of accelerating the flow once the combustion process has been completed. As a consequence, deLaval nozzle 16 must employ a convergent portion 18 for accelerating the flow from a low subsonic Mach number to a sonic condition (indicated by dotted line 41) while the total temperature $T_o$ of the gases passing through nozzle 16 remains essentially constant.

In contrast, the preferred embodiment of the present invention provides a thrust chamber 30 as shown in FIG. 1 which comprises a divergent combustor 32 for containing combusting propellants and simultaneously accelerating them to sonic flow conditions, a throttleable injector 34 axially oriented at the forward end of the combustor for injecting propellants into combustor 32 at a high initial velocity and for imparting to the injected propellants an initially rapid, axial rate of combustion and a divergent nozzle 36 axially oriented at the back end of the divergent combustor for further expanding the output of combustor 32.

By reason of the divergence in walls 38 of combustor 32 and by reason of the high initial velocity and rapid burning rate imparted to the injected propellants by injector 34, the injected propellants are accelerated while undergoing combustion to achieve sonic flow conditions at locations 40, 42 and 44, depending upon the throttle setting of injector 34. Location 40 corresponds to a full throttle setting of injector 34, location 42 corresponds to an intermediate throttle setting and location 44 corresponds to the lowest throttle setting. For each throttle setting, the expansion ratio delivered by the engine is determined by the ratio of the area at nozzle exit plane 46, which is fixed in the preferred embodiment, divided by the cross-sectional area of combustor 32 at locations 40, 42 or 44 depending upon the throttle setting of injector 4. Since the subject cross-sectional areas of combustor 32 become smaller as the throttle of injector 34 is cut back, thrust chamber 30 provides at full throttle a moderate expansion ratio (approximately 8 in the embodiment shown in FIG. 1) as would be desired for a first stage launch engine and provides at low throttle a high nozzle expansion ratio (approximately 14.4 in the embodiment shown in FIG. 1) as would be desired for operation in space. Thrust chamber 30 therefore provides a variable nozzle expansion ratio despite its fixed geometry and does so by providing means for allowing the location of sonic flow conditions to be positioned variably within divergent combustor 32 according to throttle setting. Although the embodiment shown in FIG. 1 can range in expansion from 8 to 14.4, other embodiments might be constructed to provide different ranges such as from 40 to 80.

It is to be understood that the dotted lines designated locations 40, 42 and 44 in FIG. 1 are pictorial representations of where the injected propellants achieve sonic flow conditions within combustor 32. Consequently, the dotted lines bulge in the manner characteristic of sonic flow lines. It is also to be noted that, as injector 34 is throttled down, the sonic flow line becomes located closer and closer to injector 34 as is perceivable from the spacial arrangement of locations 40, 42 and 44. Only one sonic line exists at any given throttle setting.

The ability of thrust chamber 30 to accelerate the combusting propellants to sonic flow conditions by the time they reach either location 40, 42 or 44 within combustor 32 is governed substantially by the following equation:

$$\frac{dM^2}{M^2} = \frac{-2\left(1 + \frac{\gamma - 1}{2} M^2\right)}{1 - M^2} \frac{dA}{A} + \frac{(1 + \gamma M^2)\left(1 + \frac{\gamma - 1}{2} M^2\right)}{1 - M^2} \frac{dT_o}{T_o} \quad (2)$$

As is suggested by the above equation, injector 34 is constructed such that it imparts an axial rate of combustion such that the $dT_o/T_o$ term of equation (2) overcomes the negative of the $dA/A$ term so that the $dM^2/M^2$ term is positive. It is also to be noted that equation (2) reduces approximately to the following relationship:

$$\frac{dT_o}{T_o} \gtrsim \frac{2}{1 + \gamma M^2}\left(\frac{dA}{A}\right) \quad (3)$$

Thus for small Mach numbers, $$\frac{dT_o}{T_o} \gtrsim 2\frac{dA}{A} \quad (M << 1.0) \quad (4)$$

and accordingly, the axial rate of combustion and temperature rate rise near combustor inlet plane 48 must proceed at a rate twice as great as the axial rate of area change resulting from the divergence of walls 38 of combustor 32. As the combusting propellants approach sonic flow conditions, the relationship becomes:

$$\frac{dT_o}{T_o} \gtrsim .897 \frac{dA}{A} \quad (M \sim 1.0 \ @ \ \gamma = 1.23) \quad (5)$$

Thus, in the case of the preferred embodiment wherein the divergence of walls 38 of combustor 32 are set at a half-angle α of approximately 6.5° (so that the term dA/A is constant), the axial rate of combustion must proceed vigorously at first and and then taper-off as the combusting gasses approach transonic speeds. As will be explained in the description which follows, injector 34 incorporates certain design features to deliver the above described burning schedule.

By reason that thrust chamber 30 is constructed in accordance with the above constraints, at full throttle the combusting propellants obtain Mach 1 at location 40 in combustor 32, whereupon the flow enters nozzle 36 to be further expanded to supersonic velocities. At an intermediate and low throttle setting, sonic flow conditions are achieved at locations 42 and 44 respectively, wherefrom the remainder of the combustor 32 beyond the respective location 42 and 44 and nozzle 36 serve to further expand the flow. Consequently, thrust chamber 32, as it is throttled down, will exhibit an increasingly greater expansion ratio by reason of the reduced throat area (corresponding to the cross-sectional area of combustor 32 at locations 42 and 44) at the lower throttle settings. Ideally, the divergence of walls 38 and the output of injector 34 should be matched during the design-phase of constructing such that the ratio of thrust to throat area is held constant over the range of throttle settings, which matching causes the combustion pressure ($P_c$) to favorably remain constant over the operating range of the engine. By maintaining constant combustion pressure, gas kinetic losses and losses due to incomplete combustion can be minimized. This matching entails providing an injector geometry design and throttling orifice structure which allows the burning rate to proceed to substantial completion by the time the combusting gases reach the sonic line position 40, 42 or 44. If the rate is too slow, the divergence of combustor 32 must be decreased or conversely, if the burning rate is too quick, the divergence must be increased. Moreover, the stability of the sonic line positioning must be assured for a given throttle setting.

Referring to FIG. 1, walls 38 of combustor 32 are provided with a divergence of an average half-angle α of approximately $6\frac{1}{2}$°, but in many applications it will range upwardly to 7° or more or downwardly to less than 5° depending upon the axial burning rate profile and pressure achieved by injector 34. In the alternative, walls 38 can follow a contour described by the polynomial form:

$$y = \sum_{N=0}^{n} a_n X_n^n \qquad (6)$$

where y is the radial coordinate and X is the distance from the injector face toward the throat plane. An alternate exponential shape can be described by:

$$y = C_o + C_1 e^{C_2 X} \qquad (7)$$

or a more complex summative series of exponential elements.

Figure 3:
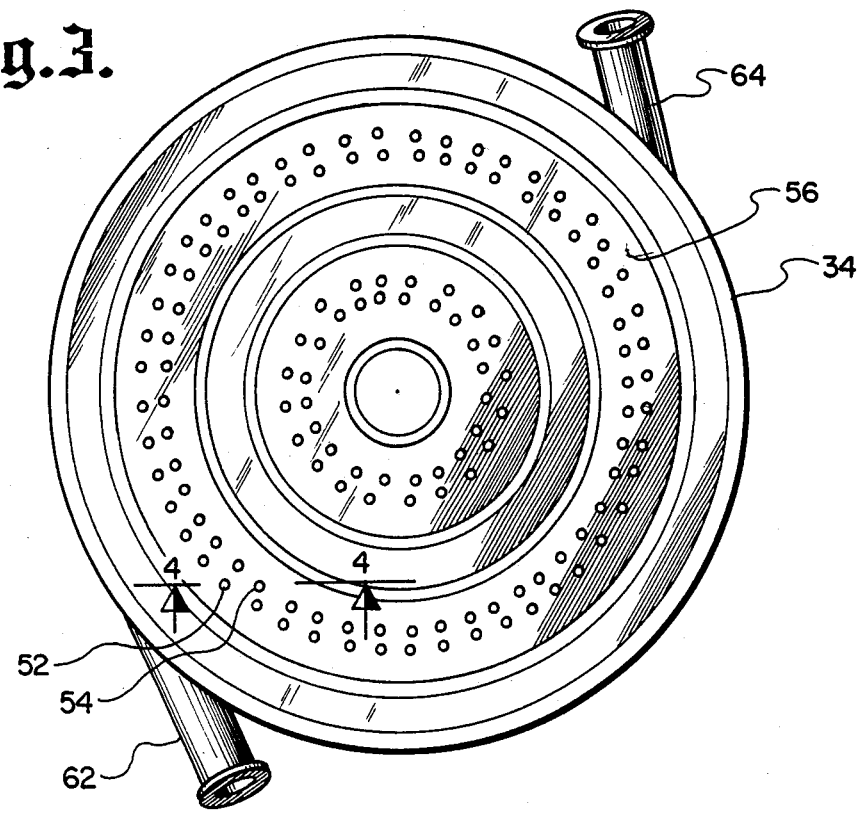
FIG. 3 is a frontal view of the throttleable injector used in the thrust chamber shown in FIG. 1.
Figure 4:
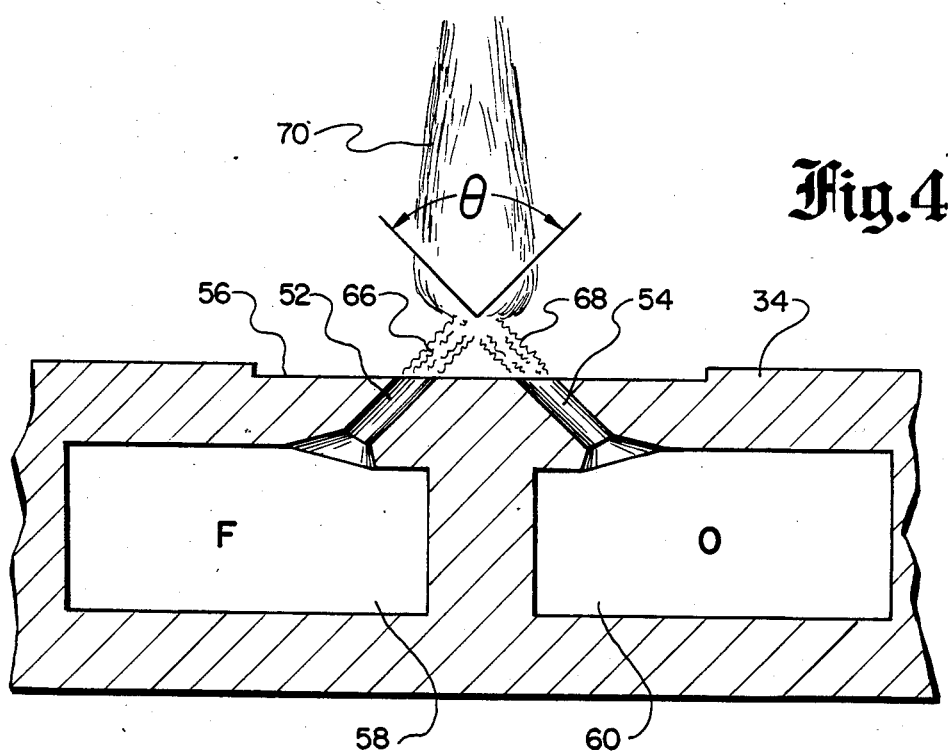
FIG. 4 is an enlarged partial sectional view taken from line A—A in FIG. 3 to show internal details of the throttleable injector used in the thrust chamber shown in FIG. 1.

Referring to FIGS. 3 and 4, injector 34 of the preferred embodiment follows established construction practices for rocket injectors in so far as it provides a plurality of matched pairs of fuel orifices 52 and oxidizer orifices 54 disposed upon injector face 56, the fuel and oxidizer orifices being organized into concentric rings, with the orifices of each ring leading from an internal fuel manifold 58 or an internal oxidizer manifold 60. These manifolds 58 and 60 are themselves ring shaped and concentrically disposed to one another in the preferred embodiment and are supplied by fuel duct 62 and oxidizer duct 64, respectively.

Injector 34 is modified, however, over the usual design in order to achieve the desired flow rate, the desired axial rate of combustion and the desired initial gas velocity necessary to support the attainment of sonic flow conditions within combustor 32. These modifications are presented by a comparison between the features of injector 14 of prior art thrust chamber 10 and those of injector 34, it being understood that thrust chamber 30 is designed to deliver the same maximum flow rate and thrust as thrust chamber 10. Because the cross-sectional area at combustor inlet plane 48 is smaller than the area at location 40, injector face 56 will be considerably smaller in cross-section area than that of injector 14 employed in prior art thrust chamber 10. Accordingly, the pairs of fuel and oxidizer orifices 52 and 54 in injector 34 are about twicely more densely arrayed than in prior art injector 14 and are approximately twice as small in diameter (orifices 52 and 54 of injector 34 are reduced in diameter from the more usual 30 to 60 thousandths of an inch to 10 to 15 thousandths in the preferred embodiment). The operating pressures of injector 34 are elevated above those of the prior art by at least 100 percent. This increased injector pressure drop can be provided by the extraction of additional boost from the turbopumps in the overall engine system or by other means well within the cognizance of those versed in the art of rocket engine systems. Injector 34 is further modified to provide an angle of impingement θ between paired fuel and oxidizer orifices 52 and 54 or approximately 90°, which, in conjunction with the increased operating pressures, causes the emitted small jetlets of fuel and oxidizer 66 and 68 to form a gaseous plume 70 of combusting gases having a very rapid initial burning rate and a high initial velocity (approximately Mach 0.15 to Mach 0.20 as compared to an initial velocity of Mach 0.05 commonly found in the prior art). Prior art injector 14 commonly employs an angle of incidence of approximately 60°. By reason of this high initial velocity and initially rapid burning rate, and because of the diminutive size of injector 34 in comparison to the large flow rates passing therethrough, walls 38 actually constrict the combusting gases being ejected from injector 34 and rapidly accelerate them to sonic flow conditions.

Figure 6:
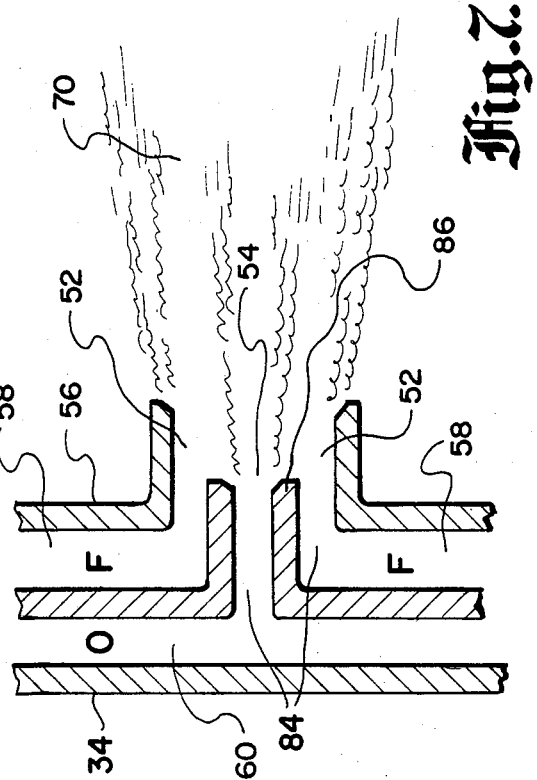
FIG. 6 is an enlarged partial sectional view taken from line A—A in FIG. 3 to show details of another embodiment of a throttleable injector wherein pintle valves are employed.
Figure 5:
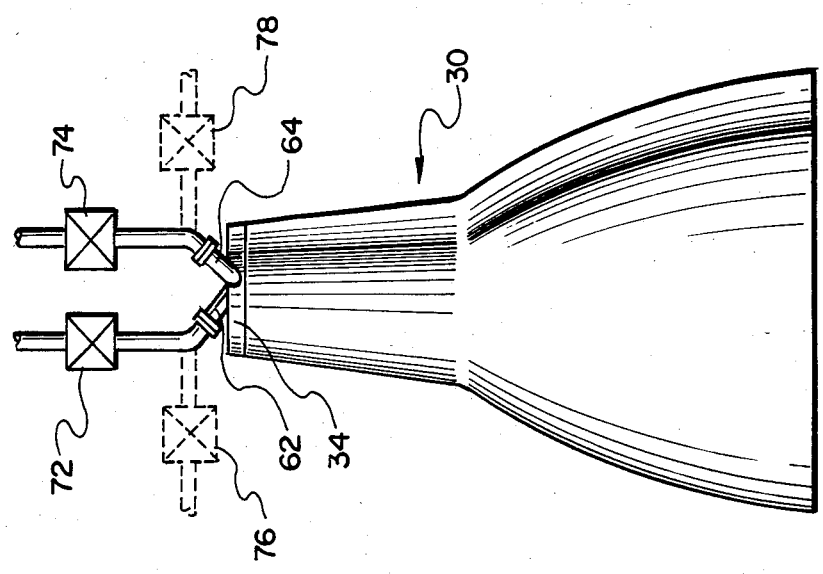
FIG. 5 shows in solid lines the arrangement of external valves used to throttle the injector shown in FIG. 4 and shows with both with solid and dotted lines another embodiment of the variable-area thrust chamber wherein an aeration injection system is also employed to throttle the injector.

Referring to FIG. 5, injector 34 is made throttleable by external valving elements 72 and 74 which control the flow rates into fuel duct 62 and oxidizer duct 64 respectively, in accordance with practice well known to the art. Referring now also to the dotted portion of FIG. 5, throttling can also be achieved through use of an aeration system wherein inert gas in introduced into fuel and oxidizer ducts 62 and 64 through inert gas control valving elements 76 and 78 as the flows of fuel and oxidizer are throttled by valves 72 and 74, respectively. The inert gas can be supplied by the same source as that used to pressurize the propellant tanks of the engine system or from one or both of the propellants heated to a gaseous form in the cooling jacket. In FIG. 6 there is shown another embodiment of injector 34 wherein throttling is achieved by pintle valves 80 and 82 whose axial movements are effected by external cams (not shown) for the purpose of opening and closing orifices 52 and 54, respectively. In FIG. 7 there is shown another embodiment of injector 34 wherein coaxial, momentum exchanger injector elements 84 are employed. Because coaxial injector elements 84 are considerably smaller than those commonly employed in the prior art, and because tip 86 of the oxidizer orifice 54 is recessed further back than usual, injector element 86 initiates rapid combustion close to injector face 56 as is desired for the practice of the present invention.

As previously discussed, injector 34 is smaller than injector 14 of the prior art (compare FIGS. 1 and 2) and yet injector 34 will usually be required to provide the same maximum flow rate. Consequently, injector 34 has smaller, more numerous and more densely arranged injector elements than prior art injector 14. The injector elements also operate at a higher pressure. However, it is to be realized that these differences work favorably towards the practice of the present invention because the increases in both the operating pressures and numbers of the injector elements and the decreases in their size and spacing promote rapid initial combustion and favor high initial velocities in the propellants.

For purposes of comparison, Table I provides the approximate dimensions of prior art thrust chamber 10 as it would correspond to an Atlas B-3 booster thrust chamber and the approximate dimensions of thrust chamber 30 constructed according to the present invention and providing the same maximum thrust and flow rate as thrust chamber 10. FIGS. 1 and 2 indicate the respective points of measurement for the following terms: $L_c$ (length of combustor); $L_N$ (length of nozzle); $D_e$ (nozzle diameter at its exit plane); $D_t$ (nozzle diameter at the nozzle throat for thrust chamber 10 and the diameter at the exit of combustor 32 for thrust chamber 30). $D_i$ (diameter at the combustor inlet), and $\epsilon$ (the expansion ratio of the thrust chamber).

TABLE I

|  | Thrust Chamber (Invention) | Thrust Chamber (Prior Art) |
|---|---|---|
| $D_c$ | 45.6 | 45.6 |
| $D_t$ | 16.2 | 16.2 |
| $L_n$ | 55.7 | 73.7 |
| $L_c$ | 18.0 | 10.0 |
| $L_c + L_n$ | 73.7 | 83.7 |
| $D_i$ | 12.0 | 20.6 |
| $\epsilon_1$ (full thrust) | 7.96 | 7.96 |
| $\epsilon_2$ (intermediate thrust) | 12.3 | 7.96 |
| $\epsilon_3$ (low thrust) | 14.4 | — |

As Table I reveals, nozzle 36 of thrust chamber is dimensionally similar to the divergent portion 22 of nozzle 16 of prior art chamber 10. It also shows that thrust chamber 30 is shorter and more compact and thus presents a significant savings in space envelope and weight. This advantage is in addition to the advantage that thrust chamber 30 provides a variable nozzle expansion ratio so that at launch it can deliver full thrust with maximum propellant flow rate at a moderate expansion ratio and in space can deliver reduced thrust at a moderate propellant flow rate at an efficient, high expansion ratio.

Obviously, many modifications and variations of the present invention are possible in light of the above teachings. In particular, thrust chamber 30 might be dimensioned differently from the preferred embodiment to thereby achieve a different range of expansion ratios. Additionally, alternate means for throttling injector 34 might be employed as well as other means for achieving a rapid burning rate. It is therefore to be understood that, within the scope of the appended claims, the invention may be practiced otherwise than as specifically described.

What is claimed and desired to be secured by Letters Patent of the United States is:

1. A rocket thrust chamber with a variable expansion ratio nozzle comprising:
    a fixed geometry divergent combustor;
    an injector axially oriented at a forward end of said divergent combustor for injecting propellants into said divergent combustor at a high initial velocity and an initially rapid burning rate;
    throttling means for variably positioning the location of sonic flow conditions within said divergent combustor according to the following equation:

$$\frac{dM^2}{M^2} = \frac{-2\left(1 + \frac{\gamma - 1}{2} M^2\right)}{1 - M^2} \frac{dA}{A} + \frac{(1 + \gamma M^2)\left(1 + \frac{\gamma - 1}{2} M^2\right)}{1 - M^2} \frac{dT_o}{T_o}$$

where M is the Mach number of the combustion product gases, $\gamma$ is the specific heat ratio of said gases, A is the cross-sectional area of the combustor at a selected axial location, and $T_o$ is the total temperature of said gases, said throttling means including:
    means for injecting propellants at a full throttle first rate to achieve sonic flow conditions at a first selected axial location adjacent a back end of said divergent combustor,
    said latter means further providing for injection of propellants at a lower second rate to achieve sonic flow conditions at a second selected axial location intermediate said injector and said first selected axial location; and
a fixed geometry divergent nozzle attached at the back end of said divergent combustor for further expanding the output of said combustor, said nozzle being abruptly more divergent than said combustor near the region of attachment to said combustor.

2. The thrust chamber as claimed in claim 1, wherein the divergence of said combustor is described by an average half angle of less than 7°.

3. The thrust chamber as claimed in claim 1, wherein the divergence of said combustor is described by the formula:

$$y = \sum_{n=0}^{n} a_n X_n^n$$

where y is a radial coordinate and x is the distance from the injector to said back end of said combustor.

4. The thrust chamber as claimed in claim 1, wherein said throttling means is at least one valve external to said injector for controlling the flow of propellants into said injector.

5. The thrust chamber as claimed in claim 4, wherein said throttling means includes an aeration injection system.

6. The thrust chamber as claimed in claim 1 wherein said injector comprises impinging fuel and oxidizer orifices.

7. The thrust chamber as claimed in claim 6, wherein said fuel and oxidizer orifices are aligned according to an approximately 90° angle of impingement.

8. The thrust chamber as claimed in claim 6 wherein said throttling means are pintle valves internal of said injector.

9. The thrust chamber as claimed in claim 1 wherein said injector comprises momentum exchanger injector elements.

* * * * *